May 8, 1951 W. C. FERGUSON 2,551,834
PROTECTIVE PLASTIC CAP
Filed June 9, 1947
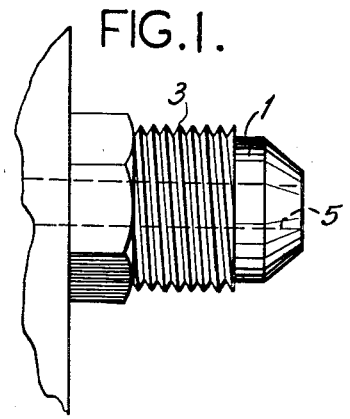
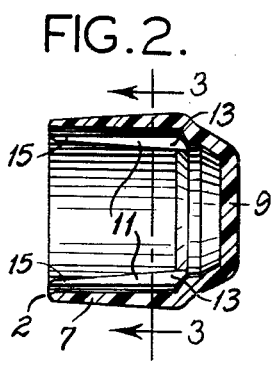
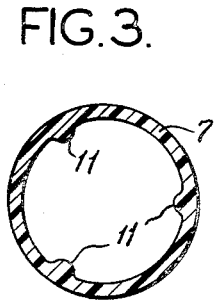
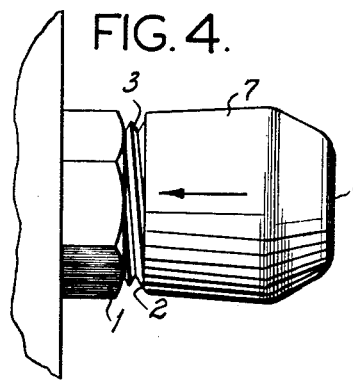
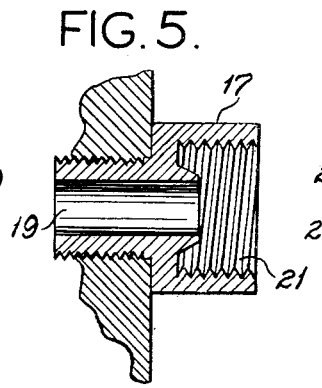
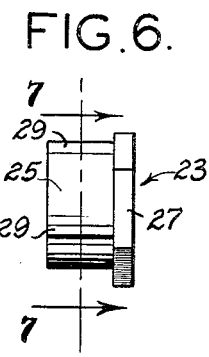
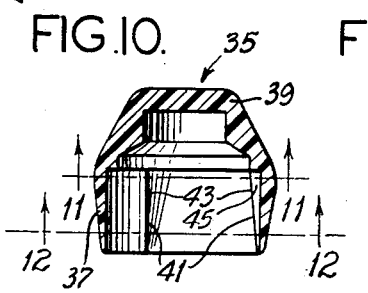
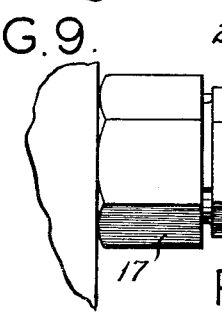
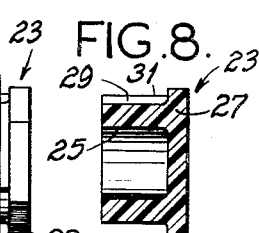
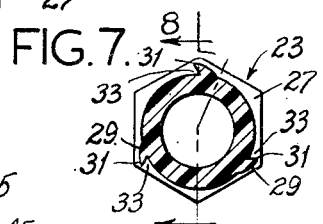
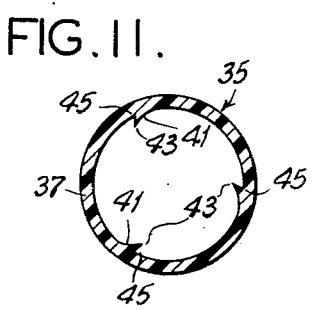
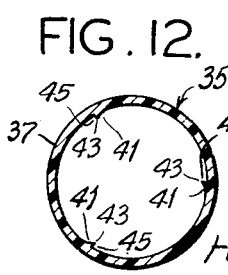
William C. Ferguson,
Inventor.
Haynes and Koenig,
Attorneys.

Patented May 8, 1951

2,551,834

UNITED STATES PATENT OFFICE 2,551,834

PROTECTIVE PLASTIC CAP

William C. Ferguson, St. Louis, Mo., assignor to The Presstite Engineering Company, St. Louis, Mo., a corporation of Missouri Application June 9, 1947, Serial No. 753,421

6 Claims. (Cl. 138—96)

This invention relates to protective caps, and with regard to certain more specific features, to plastic caps for protecting vulnerable machine parts and the like.

Among the several objects of the invention may be noted the provision of an improved protective cap for application to vulnerable machine and similar parts during their transportation to protect these parts from damage and against entry of dirt, moisture, etc.; the provision of a cap of the class described which may be applied with maximum speed and minimum effort; the provision of a cap of this class which will positively remain in position during transportation but which may readily be removed thereafter; the provision of a protective plastic cap of the class described which is more economical to make than the metal caps heretofore used for the purpose; and the provision of a plastic cap of this class, the material of which after use may be economically reworked. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a side elevation of a typical machine part to be protected;

Fig. 2 is a longitudinal section of a cap embodying one form of my invention for protecting the machine part of Fig. 1;

Fig. 3 is a cross section taken on line 3—3 of Fig. 2;

Fig. 4 is a view similar to Fig. 1 but showing the cap of Figs. 2 and 3 applied thereto;

Fig. 5 is a longitudinal section showing another typical machine part;

Fig. 6 is a side elevation of a plug type of the invention for application to the machine part of Fig. 5;

Fig. 7 is a cross section taken on line 7—7 of Fig. 6;

Fig. 8 is a longitudinal section taken on line 8—8 of Fig. 7;

Fig. 9 is a side elevation of the parts shown in Fig. 5 with the parts shown in Figs. 6, 7 and 8 applied thereto;

Fig. 10 is a view similar to Fig. 2, showing an alternative form of hollow cap; and, Figs. 11 and 12 are cross sections taken respectively on lines 11—11 and 12—12 of Fig. 10.

Similar reference characters indicate corresponding parts throughout the several views of the drawings.

The more vulnerable elements of machines and machine parts require protection during transportation. This is particularly true of threaded, serrated and similarly formed nipples, sockets and the like, which should have their threads or similar forms protected and their openings guarded against entry of dirt, moisture, etc. Heretofore protectivce caps for such parts have been made of metal and conventionally threaded to cooperate with the threaded member to be protected. Such metal caps were costly and consumed time in their applications. The metal was hard enough sometimes to cause damage if the cap was not handled carefully by a workman in manipulating it. Such a metal cap could not be reworked as scrap as conveniently as the cap of the present invention, besides being made of inherently expensive material.

Referring now more particularly to Fig. 1, there is shown, for example, at numeral 1 a fitting on a machine part having threads 3 and an opening 5, both to be protected. In Figs. 2 and 3 are shown details of one form of cap of the present invention. This is formed of a resilient, yielding plastic material such as Vinylite, cellulose acetate, cellulose acetate butyrate or the like. These plastic materials may be shaped as shown in the drawings and will retain such a form, but are yielding enough to permit considerable deformation under pressure without breaking.

The form of the cap shown in Figs. 2 and 3 comprises an open, more or less true cylindric sleeve portion 7, enclosed at one end by a wall 9. A cup or cap is thus formed. The sleeve portion 7 carries internal axial ridges 11. The exact number of these is variable, but three of them equally spaced around the periphery is satisfactory. Each longitudinal ridge 11 is deepest or thickest near the end closure 9 (as indicated at numeral 13) and shallowest toward the open rim 2 of the cap, as indicated at numeral 15. The inside diameter of the cylinder 7 is only slightly greater than the outside diameter of the threads 3. Thus if the cap is placed over the fitting 1, the ridges 11 will wedge over the threads 3, becoming somewhat scarified or deformed. That is, the ridges are bitten into by the threads. Inasmuch as the cap material is resilient relatively to the metal of which the fitting 1 is usually composed, there will be a radial gripping and locking action between the ridges 11 and the threads 3. This action reaches a maximum at the deep portions 13 of the ridges as the cap is axially pressed home to its final position, such as shown in Fig. 4. No threading on of the cap is necessary. In the final position, the cylinder 7 protects the threads 3 and the enclosure 9 covers the opening 5. Thus the machine part in question is protected against damage in transit and against entry of dirt, moisture and the like.

From the above it is clear that the cap is very easily applied simply by an axial push (see Fig. 4). The gripping action between the ridges and the thread prevents inadvertent removal of the cap during transit. When it is desired to remove the cap to put the fitting 1 into use, it is only necessary to turn it counterclockwise (for right-hand threads) or clockwise (for left-hand threads) whereupon it readily disengages by a helical unthreading motion. It may be observed that it is not as practicable to pull the cap off axially as to apply it axially, because the necessary pinching action around the cap during attempted withdrawal only accents the biting grip between the threads and the ridges. Such pinching action is not necessary during application. Thus the arrangement is such that easy axial application may be made but accidental axial removal is a remote contingency. Nevertheless, intended removal by unthreading is readily accomplished.

In Figs. 5-7 is shown a plug form of the invention for protecting sockets. The fitting to be protected, as shown at numeral 17, has an opening 19 and internal threads 21. A plug cap is shown at numeral 23 in Figs. 6-9 and comprises a cylindric sleeve-like plug portion 25 having a flanged end 27 with axial ridges 29 extending along the outside of the plug portion 25 from under the flange 27. The ridges in this case may or may not be tapered. They are shown nontapered, for example. They have a special cross-sectional form, as shown in Fig. 8, the outer edges 31 having adjacent notches as indicated at 33. This provides in the aggregate of the ridges a spiral direction to their extensions. The direction of the spiral is arranged so that the notch 33 trails the motion of the ridge when, after axial application, the cap is rotated for a normal unthreading operation. It will be clear that the cap may be pressed home axially by means of the fingers, but if it is desired, it may be lightly axially tapped with a hammer for the purpose. Thus in Fig. 7 the direction of the spiral ridges is indicated as counterclockwise for unscrewing from the right-hand threads 21.

The diameter of a circle centered on the axis of the cap and passing through the edges 31 is approximately equal to the outside diameter of the threads 21; whereas the diameter of the plug 25 proper is equal to or slightly less than the inside diameter of these threads 21. Thus when the cap of Figs. 6 and 8 is axially applied and forced into the fitting shown in Figs. 5 and 9, the result will be as shown in Fig. 9, wherein the plug 25 closes the opening in the threads 21. The ridges 29, due to their spiral sections, tend to collapse under the threads with some scarification. However, in view of the spiral sectional forms of the ridges, the scarification is less than it would be otherwise. Hence, when the plug cap is in its final position (Fig. 9) the normal tendency of the ridges is to spring outward, thus locking them securely in the threads 21. But upon turning the cap counterclockwise for unthreading and removal, these ridges tend to bend down thus facilitating the removal operation. In this form of the invention the unthreading type of removal action is particularly important, since it is usually unpracticable to pull the cap off axially by gripping the small end 27.

In Figs. 10-12 is shown the application of axial ridges of spiral cross sections to the inside of a cap. The cap is shown in general at numeral 35, and comprises a sleeve portion 37 with a closure portion 39. In the sleeve 37 are axial ridges 41. In this case these are also tapered axially, becoming shallower toward the open edge of the cap. In addition, they are formed in cross section (see Figs. 11 and 12) as spirals having top edges 43 with trailing notch portions 45. This cap is axially applied and is removed by rotation as was described in connection with the forms shown in Figs. 2 and 3. It has the advantage of the tapered ridge, which facilitates axial application, and the notched ridge, which facilitates rotary removal.

It should be understood that it is not necessary that the notches 33 be undercut, but simply that the cross sections of the ridges be formed in the nature of teeth which slope backward in respect to any unthreading action of the cap relatively to said threads.

It will be observed that the caps above-described are particularly applicable to threaded parts, or to those having similar forms such as serrations or the like. But the caps are also useful on unthreaded members inasmuch as the ridges enhance a frictional engagement with the unthreaded sides.

The term "axial" as used herein to define the directions of the ridges is intended to cover not only cases where the ridges are exactly parallel with the axis of the cap, but also where there is some deviation from such parallelism. The important point is that these ridges shall have directions extending across the threads or serrations on the part to be protected, and it is therefore intended that the term axial used in connection with the ridges shall apply to such ridges, for instance, somewhat angled ridges which nevertheless extend from end to end of the sleeve on which they are located.

In all forms of the invention the hollow chamber of the cylindric sleeve carrying the ridges ensures a resiliency of the ridges which, when the cap is axially applied, allows them effectively to grip the threads without being entirely cut away.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A protective member for open substantially cylindric machine nipples having threads, comprising a cap composed of a resilient plastic material and including a substantially cylindric portion of a diameter adapted freely to telescope axially with said threads, and axial ridges on said cylindric portion adapted to be deformed upon axial engagement of the cap with the machine nipple to cooperate with said threads to hold the member on the nipple, said ridges being of spiral section to enhance their springing cooperation with the threads upon axial engagement, the spiral direction being such as to minimize resistance to unthreading for removal.

2. A protective member for open substantially cylindric machine nipples having threads, comprising a cap composed of a resilient plastic material and including a substantially cylindric portion having an open end and being of a diameter adapted freely to telescope axially with said threads, and axial ridges on said cylindric portion tapering away from the opening to become deeper so as to be deformed by the threads upon axial engagement of the cap with the machine nipple, said ridges being of spiral section to enhance their springing cooperation with the threads upon axial engagement, the spiral direction being such as to minimize resistance to unthreading for removal.

3. A resilient protective cap comprising a plastic body portion formed substantially as a cylinder, said cylinder being adapted to telescope with threads of a member to be protected, and axially directed ridges on the part of the cylinder facing the threads, said ridges being deeper adjacent the closed end of the cylinder than adjacent its open end so as to engage with and become deformed by the threads, said ridges having cross sections in the nature of spirals which extend backward in respect to unthreading action of the cap relatively to said threads.

4. A resilient protective cap comprising a plastic body portion formed substantially as a cylinder which is enclosed at one end, said cylinder being adapted to telescope with threads of a member to be protected, and axially directed ridges on the part of the cylinder facing the threads, said ridges having cross sections in the nature of spirals which extend backward in respect to any unthreading action of the cap relatively to said threads.

5. A resilient protective cap comprising a plastic body portion formed substantially as a cylinder which is enclosed at one end, said cylinder being adapted to telescope outside of the threads of a member to be protected, and axially directed ridges on the inside of said cylinder, said ridges becoming deeper in a direction extending from the open end of the cylinder to its closed end and having cross sections in the form of spirals which extend backwards in respect to any unthreading action of the cap relatively to said threads.

6. A protective member for threaded machine parts comprising a substantially true cylinder composed of resilient plastic material, said cylinder having a leading end for advancement toward said threads upon axial application of the cylinder thereto, said end having a diameter adapted freely to be moved along said threads, and substantially axial ridges on the cylinder which enlarge from a shallow thickness at the advancing end to a greater thickness whereby the threads increasingly bite into said ridges as the protective member is tightly wedged into the threads but is removable by unthreading.

WILLIAM C. FERGUSON.

REFERENCES CITED

The following references are of record in the file of this patent:

UNITED STATES PATENTS

| Number | Name | Date |
|---|---|---|
| 1,190,866 | Crawford | July 11, 1916 |
| 1,229,928 | Frazer | June 12, 1917 |
| 1,898,654 | Breslauer | Feb. 21, 1933 |
| 2,064,042 | Von Till | Dec. 15, 1936 |
| 2,304,532 | Boxley | Dec. 8, 1942 |

FOREIGN PATENTS

| Number | Country | Date |
|---|---|---|
| 259,113 | Great Britain | Oct. 7, 1926 |